United States Patent
Eldada et al.

(10) Patent No.: US 6,560,386 B2
(45) Date of Patent: May 6, 2003

(54) TUNABLE OPTICAL ADD/DROP MULTIPLEXER

(76) Inventors: Louay Eldada, 38 Piersons Hill Rd., Randolph, NJ (US) 07869; Robert A. Norwood, 203 N. Union Ave., Cranford, NJ (US) 07016

( * ) Notice: Subject to any disclaimer, the term of this patent is extended or adjusted under 35 U.S.C. 154(b) by 0 days.

(21) Appl. No.: 10/222,078

(22) Filed: Aug. 16, 2002

(65) Prior Publication Data

US 2003/0021535 A1 Jan. 30, 2003

Related U.S. Application Data

(63) Continuation of application No. 09/695,886, filed on Oct. 25, 2000, now Pat. No. 6,438,293, which is a continuation of application No. 09/251,892, filed on Feb. 19, 1999, now Pat. No. 6,389,199.
(60) Provisional application No. 60/075,511, filed on Feb. 20, 1998.

(51) Int. Cl.$^7$ .................................................. G02B 6/26
(52) U.S. Cl. ...................... 385/37; 359/107; 359/169
(58) Field of Search .............................. 385/37, 39, 147, 385/24; 359/107, 137, 169

(56) References Cited

U.S. PATENT DOCUMENTS 6,438,293 B1 * 8/2002 Eldada et al. ................. 385/37

FOREIGN PATENT DOCUMENTS

| EP | 0642052 A1 | 3/1995 |
| EP | WO9715851 A | 5/1997 |
| EP | 0778479 A2 | 6/1997 |
| EP | 0854378 A2 | 7/1998 |
| GB | 2269679 A | 2/1994 |
| JP | 07 084225 A | 3/1995 |
| JP | 07 092313 A | 4/1995 |

OTHER PUBLICATIONS

Eldada, L. et al, Thermooptic Planar Polymer Bragg Grating OADM's with Broad Tuning Range, IEEE Photonics Technology Letters, vol. 11, No. 4, Apr. 1999, pp. 448–450.
D. C. Johnson, et al. "New Design Concept For A Narrowband Wavelength–Selective Optical Tap And Combiner", Electron Lett, vol. 23, pp. 666–669 (1987) (No date).
L.B. Soldano, et al., "Optical Multi–Mode Interference Devices Based On Self–Imaging: Principles And Applications", J. Lightwave Technology, vol. 13, pp. 615–627 (1995) (No date).
K.O. Hill, et al., "Fiber Bragg Grating Technology Fundamentals And Overview", J. Lightwave Technology, vol. 15, pp. 1263–1276 (1997) (No date).
T. Erodogen, "Fiber Grating Spectra", J. Lightwave Technology, Vo.1. 15, pp. 1277–1294 (1997) (No date).
L. Eldada, et al., Integrated Multi–Channel OADM's Using Polymer Bragg Grating MZI's, Photonics Technology Letters, vol. 10, pp. 1416–1418 (1998).
Marcatili, E.A.J., "Dielectric Rectangular Waveguide And Directional Couplers For Integrated Optics", Bell Systems Technology, Jr., p. 2071 (1969) (No date).
C.R. Giles, et al., "Low–Loss Add/Drop Multiplexers For WDM Lightwave Networks", Pro. IOOC, pp. 66–67 (1985) (No date).

* cited by examiner

Primary Examiner—Akm E. Ullah (57) ABSTRACT

Optical signal devices, wavelength division multiplexer/demultiplexer optical devices, and methods of employing the same in which the core layer includes a grating and is comprised of a material whose refractive index is tuned so that the grating reflects a preselected wavelength of light. A single optical signal device can therefore be used to select a variety of wavelengths for segregation.

10 Claims, 11 Drawing Sheets

TUNABLE OPTICAL ADD/DROP MULTIPLEXER

CROSS-REFERENCE TO RELATED APPLICATIONS

This application is a continuation of U.S. patent application Ser. No. 09/695,886, filed on Oct. 25, 2000 now U.S. Pat. No. 6,438,293; which is a continuation of U.S. patent application Ser. No. 09/251,892, filed Feb. 19, 1999 now U.S. Pat. No. 6,389,199; which claims the priority of U.S. Provisional Patent Application Ser. No. 60/075,511, filed Feb. 20, 1998. The content of all the aforesaid applications are relied upon and incorporated herein by reference in their entirety.

FIELD OF THE INVENTION

The present invention is generally directed to improved integrated wavelength division multiplexer/demultiplexer optical devices in which light of a specific wavelength (or specific wavelengths) can be added or dropped in an efficient manner. The device can be fabricated from optical polymers having a large index of refraction variation with temperature. A single filter element may be used over a wide wavelength range thereby providing for dynamic selection of wavelengths.

BACKGROUND OF THE INVENTION

Devices for adding/dropping wavelength coded signals (light of a specific wavelength or wavelengths) are known in the art as disclosed in D. C. Johnson, K. O. Hill, F. Bilodeau, and S. Faucher, "New Design Concept For A Narrowband Wavelength-Selective Optical Tap And Combiner," *Electron Lett.*, Vol. 23, pp. 668–669 (1987) and C. R. Giles and V. Mizrahi, "Low-Loss Add/Drop Multiplexers For WDM Lightwave Networks," *Proc.* 100C, pp. 66–67 (1995), incorporated herein by reference. Such devices employ optical fibers which are utilized predominantly in telecommunication systems in addition to local area networks, computer networks and the like. The optical fibers are capable of carrying large amounts of information and it is the purpose of devices of the present invention to extract/inject a selected amount of information from/onto the fiber by segregating the information carried on different wavelength channels.

Devices of this type are comprised of a variety of components which together provide the desired segregation of wavelength coded signals. Integrated optical couplers and especially directional couplers have been developed to accomplish evanescent directional coupling as disclosed in E. A. J. Marcatili, "Dielectric Rectangular Waveguide And Directional Couplers For Integrated Optics," *Bell Syst. Tech. J.*, p. 2071 (1969), incorporated herein by reference. Optical signals are coupled from one planar waveguide to another. The signals in the second planar waveguide propagate in the same direction in which the signals travel in the first planar waveguide.

MMI (multimode interference) couplers have been developed to accomplish coupling as disclosed in L. B. Soldano and E. C. M. Pennings, "Optical Multi-Mode Interference Devices Based On Self-Imaging: Principles And Applications," *J. Lightwave Technol.*, Vol.13, pp. 615–627 (1995), incorporated herein by reference. MMI couplers achieve self-imaging whereby a field profile input into a multimode waveguide is reproduced in single or multiple images at periodic intervals along the propagation direction of the guide.

Optical circulators are optical coupling devices that have at least three ports. Three-port circulators couple light entering port 1 to port 2, light entering port 2 to port 3, and light entering port 3 to port 1.

Diffraction gratings (e.g. Bragg gratings) are used to isolate a narrow band of wavelengths as disclosed in K. O. Hill and G. Meltz, "Fiber Bragg Grating Technology Fundamentals And Overview," *J. Lightwave Technol.* Vol. 15, pp.1263–1276 (1997) and T. Erdogan, "Fiber Granting Spectra," *J. Lightwave Technol.*, Vol. 15, pp. 1277–1294 (1997), incorporated herein by reference. Such grating reflectors have made it possible to construct a device for use in adding or dropping a light signal at a predetermined center wavelength to or from a fiber optic transmission system without disturbing other signals at other wavelengths as disclosed in L. Eldada, S. Yin, C. Poga, C. Glass, R. Blomquist, and R. A. Norwood, "Integrated Multi-Channel OADM's Using Polymer Bragg Grating MZI's," *Photonics Technol. Lett.*, Vol. 10, pp. 1416–1418 (1998), incorporated herein by reference.

It would be desirable to be able to drop a wavelength with more precision than current devices within a dynamic range of wavelengths for a single optical signal device rather than employing multiple optical signal devices for the same purpose.

SUMMARY OF THE INVENTION

The present invention is generally to optical signal devices having fine tuning means which provide for the more efficient control of the wavelength of light which is to be segregated from a multiple wavelength light signal.

The optical signal device of the present invention has a unique array of materials and also includes altering the temperature of the optical signal device which provides for the precise selection of a targeted wavelength for dropping or adding an optical signal and which provides for the rapid change of wavelengths from one targeted wavelength to another.

In particular the optical signal device of the present invention comprises:

a) a substrate;

b) a pair of spaced apart cladding layers comprised of materials having at least similar refractive index values;

c) a core layer including a waveguide or a pair of opposed waveguides positioned between the pair of cladding layers having a refractive index value greater than the refractive index value of the cladding layers such that the difference between refractive index values of the core layer and cladding layers enables a multiple wavelength light signal to pass through the device in a single mode;

d) a grating forming a filter means for causing a single wavelength of light of said multiple wavelength light signal to be segregated therefrom; and e) means for varying the refractive index of at least the core layer to control the wavelength of the light which is to be segregated from the multiple wavelength light signal.

In a preferred construction of the optical signal device at least the core layer is made of a thermosensitive material and the means for varying the refractive index is by heating the thermosensitive material. The thermo-optic effect, being the preferred refractive index tuning effect, is used as the illustrative effect throughout most of this disclosure. But generally, any refractive index tuning effect (e.g., electrooptic effect, stress-optic effect) and any combination thereof can be used in the present invention to vary the refractive index.

In a preferred construction of the optical signal device there are two cladding layers positioned between the refractive index varying means and the core with each of the two cladding layers having a different refractive index. Methods of fabricating the optical signal devices of the present invention are also disclosed.

BRIEF DESCRIPTION OF THE DRAWINGS

The following drawings in which like reference characters indicate like parts are illustrative of embodiments of the invention and are not intended to limit the invention.

DETAILED DESCRIPTION OF THE INVENTION

The present invention is directed to an optical signal device in which a means for varying the refractive index, preferably through the use of a heater and thermosensitive polymers, is employed in the filter element (e.g. Bragg grating) to produce a drop or add signal filter that is fine tunable for dropping or adding a preselected wavelength of light over a wide range of wavelengths.

In a preferred form of the invention, Mach-Zehnder interferometer type devices, 100% directional couplers, or multimode interference (MMI) couplers are employed having two coupling regions. Between the coupling regions comprising 3-dB directional couplers or 3-dB multimode interference couplers is a grating region comprised of a grating system (e.g. Bragg gratings). The waveguides in the grating region of Mach Zehnder type devices are typically spaced apart from each other so that evanescent coupling does not occur in this region.

In another preferred form of the invention, a single waveguide between two optical circulators is employed. In the waveguide is a grating region comprised of a grating system.

In accordance with a preferred form of the present invention, the optical signal device has a unique constructed grating region made of materials which are thermosensitive i.e which have relatively large thermo-optic coefficients (defined as the change in refractive index with temperature) of, for example, at least $10^{-4}/°$ C. in absolute value (e.g. thermosensitive polymers). Examples of thermosensitive polymers include cross-linked acrylates, polyimides and polymethylmethacrylates, as for example ethoxylated bisphenol diacrylate, tripropylene glycol diacrylate and 1,6-hexanediol diacrylate.

Figure 1:
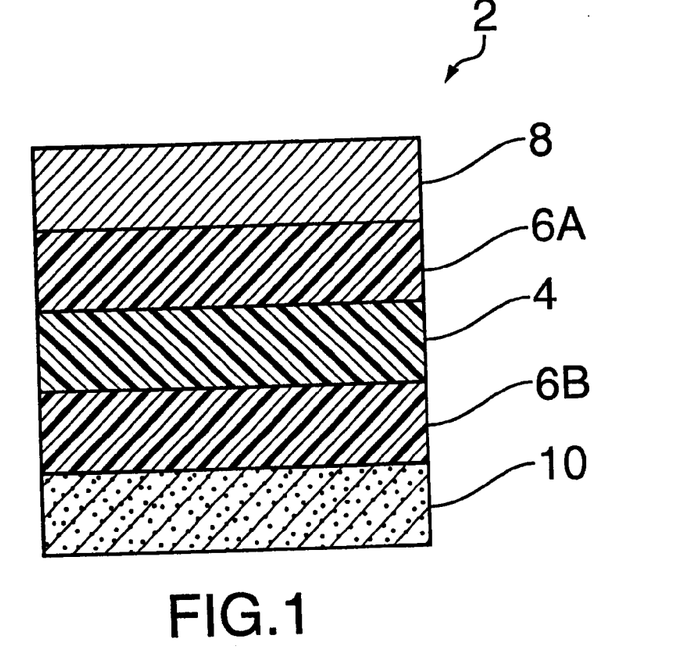
FIG. 1 is a schematic elevational view of one embodiment of a filter element of an optical signal device of the present invention.

When heating is the means for varying the refractive index in at least the core layer, the grating region is provided with a heater (such as an electrode of specified resistance) or other means of inducing a change of temperature of the polymer. Referring to FIG. 1 there is shown a first construction of the grating region of the optical device of the present invention. The filter element 2 includes a core region 4 having on each side thereof respective cladding layers 6A and 6B. The grating is present in the core region 4 and preferably additionally in the cladding layers 6A and 6B. Above the cladding layer 6A is a heater 8 which, as previously indicated, may be an electrode of specified resistance. Beneath the undercladding layer 6B there is provided a substrate 10. The core layer is made of a thermosensitive polymer as described above. The overcladding layer 6A and undercladding layer 6B are also preferably made of similar materials although the refractive index of the respective layers will differ as discussed hereinafter.

Figure 3:
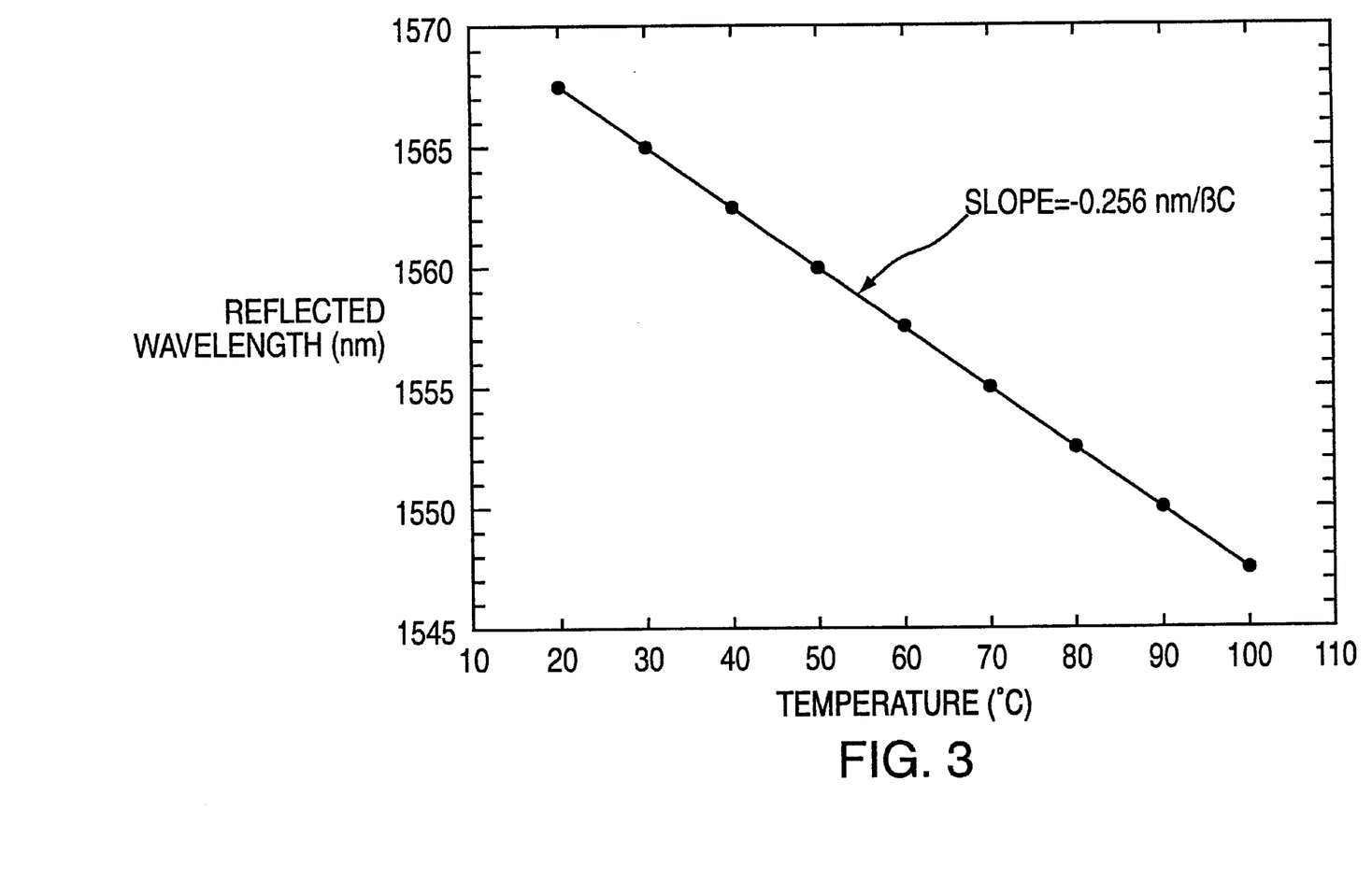
FIG. 3 is a graph showing the change in the wavelength of light reflected by a filter element employed in the present invention as a function of temperature.

In accordance with the present invention, a heater is provided in proximity to the filter element to heat the thermosensitive polymers. As shown in FIG. 3, as the temperature of the filter element is increased, the wavelength of the reflected light will change, typically in a linear slope. As shown specifically in the example of FIG. 3, the wavelength of the reflected light will decrease 0.256 nm per degree centigrade within the range of 20 to 100° C. The wavelength of the reflected light will vary linearly by about 20 nm within this temperature range. The present invention therefore changes the wavelength of the reflected light of a filter element of an optical signal device by raising or lowering the temperature of the material used to construct the filter element.

In the embodiment shown in FIG. 1, the refractive index (n) of the core 4 will exceed the refractive index of both the overcladding layer 6A and the undercladding layer 6B. It is preferred that the refractive index of the overcladding layer 6A and the undercladding layer 6B be the same although they may differ so long as both are less than the refractive index of the core layer.

In a preferred form of the invention, the undercladding layer 6B has a thickness of from about 10 to 20 μm while the overcladding layer 6A has a thickness of from about 5 to 10 μm. The thickness of the core layer is preferably from about 3 to 9 μm.

Figure 2:
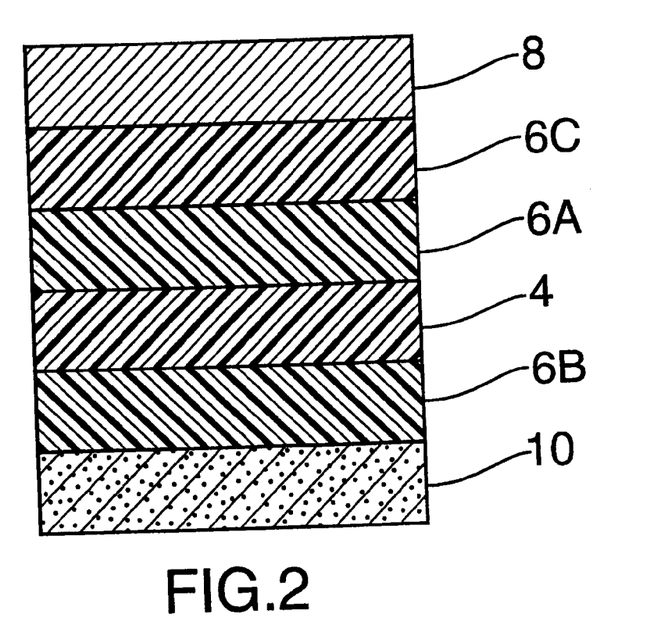
FIG. 2 is a schematic elevational view of another embodiment of a filter element of an optical signal device of the present invention employing two cladding layers of different refractive indices between a heater and a core layer.

A preferred filter element for use in the present invention is shown in FIG. 2. This filter element provides an additional overcladding layer 6C between the heater 8 and the other overcladding layer 6A. The additional overcladding layer 6C has a refractive index lower than that of the overcladding layer 6A and is added because the metal elements comprising the heater 8 have a tendency to absorb light. The additional cladding layer 6C serves to push light away from the heater and therefore provides less loss of the optical signal, while allowing the overall overcladding thickness (6A and 6C) to be small enough for the core 4 to be heated efficiently by the heater 8.

In the embodiment shown in FIG. 2, the thickness of the respective layers is the same as described above in connection with the embodiment of FIG. 1. It will be noted that the combined thickness of the overcladding layers 6A and 6C is preferably within the range of from about 5 to 10 μm.

The present invention can be applied to a cascade of optical signal devices (e.g. Mach-Zehnder based or directional-coupler based or waveguide-with-isolators based single channel elements of N stages) to produce a drop filter that is tunable over a wide range (e.g. 24 to 100 nm). A heating means is applied to the filter element and when the heating means is activated, the application of heat to the polymeric material causes a change in the reflected wavelength of the filter element.

Table 1 shown below illustrates the number (N) of stages needed given a fixed temperature range and wavelength tuning range. The value used for tunability is 0.25 nm per degree centigrade which represents the linear relationship between reflective wavelength and temperature shown and described in connection with the example of FIG. 3.

and the bandwidth is 40 nm, six stages with a tuning range of 7.5 nm per stage will be required. If fewer stages are desired, then a higher temperature range is employed. Less stages result in less insertion loss (i.e. amount of light loss in decibels, in traversing the device) but the speed at which the device is tuned to achieve a given wavelength will be reduced.

If a larger number of stages are employed (i.e. a lower temperature range) for a given bandwidth, thermal transport is more rapid. However, the larger number of stages extends the length of the optical signal device and results in higher insertion loss. It is therefore preferred to operate with a moderate number of stages with a temperature range somewhere in the middle of the 10 to 100° C. range.

The number of stages N in Table 1 also represents M in the 1xM switch that is required to select the output of a single stage. The 1xM switch can be achieved with a series of 1x2 switches (generally, 1xP where P is less than M). N becomes N-1 if the two outer stages are tuned out by a slight temperature shift outside the tuning range. It is not desirable to tune non-edge stages since it is generally desirable to use a large tuning capability to reduce the number of stages. Selective tuning, however, also means an extra heater and extra spacing between segments with different heaters whereas the whole sample can be heated uniformly if out-tuning is not employed. If out-tuning is used when the number of stages (N) is 2, no switching is required.

In accordance with the present invention, by changing the temperature of the polymeric material of the filter element, it is possible to control the wavelength which drops out in each stage of the optical signal device. Changing the temperature causes a change in the refractive index causing a wavelength change of the light that is dropped from or added to the multiwavelength light signal in accordance with the following formula $$\lambda = 2N\Lambda$$

TABLE 1

| | | Specified Bandwidth | | | | |
|---|---|---|---|---|---|---|
| | | 24 nm | 32 nm | 40 nm | 80 nm | 100 nm |
| | | Number of 100 GHz (0.8 nm) Channels | | | | |
| Temp. Range | Tuning Range per Stage | 30 channels | 40 channels | 50 channels | 100 channels | 125 channels |
| 10° C. | 2.5 nm | 10 stages | 13 stages | 16 stages | 32 stages | 40 stages |
| 20° C. | 5.0 nm | 5 stages | 7 stages | 8 stages | 16 stages | 20 stages |
| 30° C. | 7.5 nm | 4 stages | 5 stages | 6 stages | 11 stages | 14 stages |
| 40° C. | 10.0 nm | 3 stages | 4 stages | 4 stages | 8 stages | 10 stages |
| 50° C. | 12.5 nm | 2 stages | 3 stages | 4 stages | 7 stages | 8 stages |
| 100° C. | 25.0 nm | 1 stages | 2 stages | 2 stages | 4 stages | 4 stages |

As shown in Table 1, for a given temperature range there is a limit on how much tuning can occur per stage. For example, for a temperature range of 10° C. for the filter element, the range of tuning for each stage is 2.5 nm.

The filter element will contain a fixed number of channels depending on the channel spacing and the bandwidth of the telecommunications system. For example, if the telecommunications system has a bandwidth of 24 nm then 30 channels at 0.8 nm per channel will be present.

As shown in Table 1, the number of stages that are required for tuning over a given temperature range for a given bandwidth can be readily ascertained. For example, if the polymeric material and the desired tuning speed permit a temperature range of 30° C., the channel spacing is 0.8 nm wherein
λ is the wavelength to be dropped or added;
N is the effective refractive index of the material upon heating; and
Λ is the period of the grating.

Thus, heating, which changes N and typically to a lesser degree Λ, enables a change to the wavelength which is to be added or dropped.

Figure 4A:
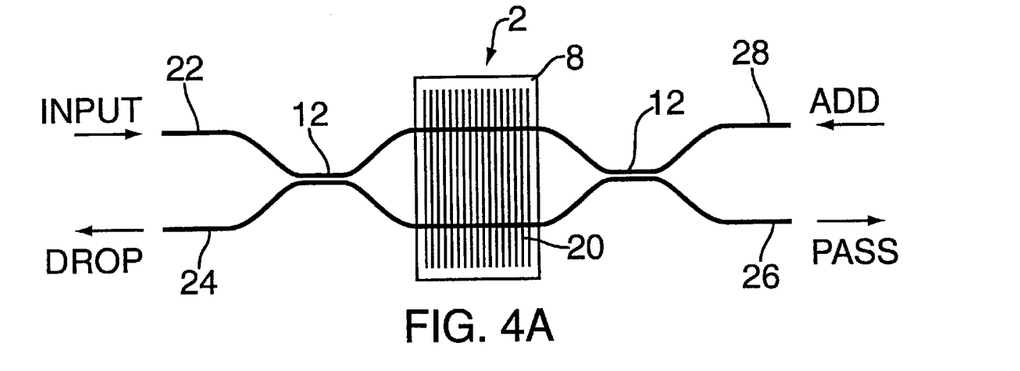
FIGS. 4A–4C are schematic views of three embodiments of a single filter element in accordance with the present invention.
Figure 4B:
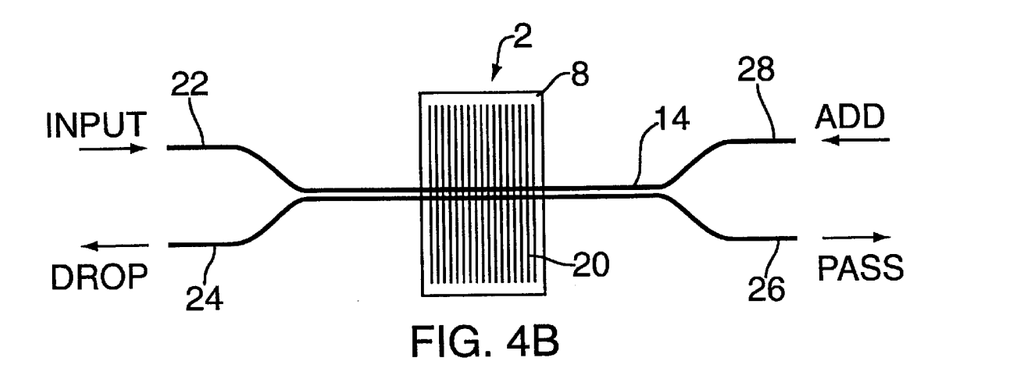
Figure 4C:
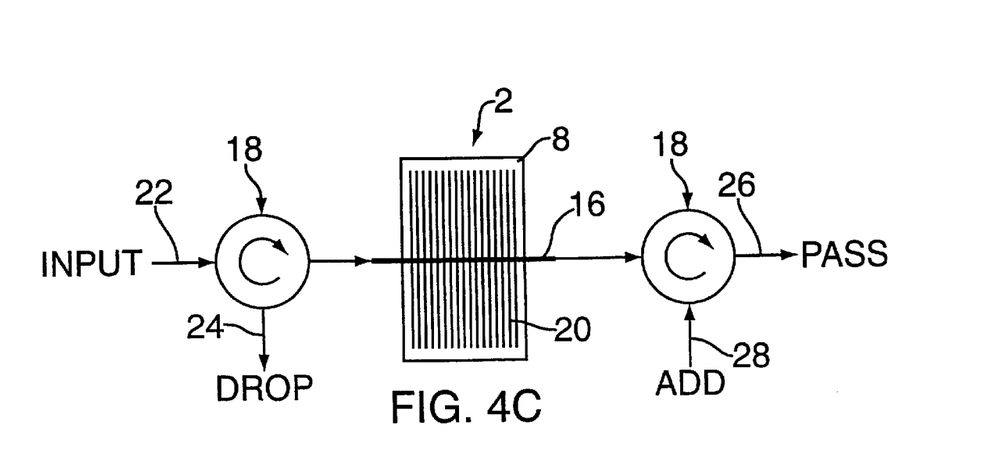

The filter element employed in the present invention is applicable to a wide variety of optical signal devices. Referring to FIGS. 4A–4C there are shown three optical signal devices employing a filter element 2 of the present invention as shown in FIG. 1 or 2. In FIG. 4A there is shown a Mach Zehnder embodiment, in FIG. 4B there is shown a 100% directional coupler embodiment, and in FIG. 4C there is shown an embodiment employing a single waveguide between two 3-port optical circulators 18. In all three embodiments the filter element includes a heater 8 transversing the grating region 20 as described in connection with FIGS. 1 and 2. In operation, a source of light of multiple wavelengths enters the grating region 20 through the input port 22. A single wavelength of light is reflected according to the temperature of the grating region as determined by the heater 8. The desired single wavelength signal is dropped from the grating region through the drop port 24 while the remaining wavelengths of light pass through the grating region and out the "pass" port 26. The wavelength determined by the heater can also be added to the wavelengths exiting the pass port by injecting it through the "add" port 28. In the FIG. 4A embodiment, the two 3-dB directional couplers 12 can be 3-dB MMI (multimode interference) couplers. In the FIG. 4B embodiment, the 100% directional coupler 14 can be replaced by a 100% MMI coupler. In the FIG. 4C embodiment, the 3-port optical circulators 18 can be replaced by 1x2 power splitters if high insertion loss and high return reflectivity can be tolerated.

The particular wavelength of light which is dropped from or added to the light source can be precisely selected in accordance with the present invention by adjusting the heater in accordance with the dependence of the reflected wavelength to temperature shown in FIG. 3. In the example shown in FIG. 3, for each ° C. that the temperature of the grating region is raised, the wavelength reflected will be reduced by 0.256 nm.

The remaining wavelengths of light which pass the filter element shown in FIGS. 4A–4C may be further processed in another filter element to enable both dropped wavelengths to enter a single switch. This enables either of the wavelengths to be dropped depending on the needs of the user. Such arrangements are shown in FIGS. 5A and 5B.

Figure 5A:
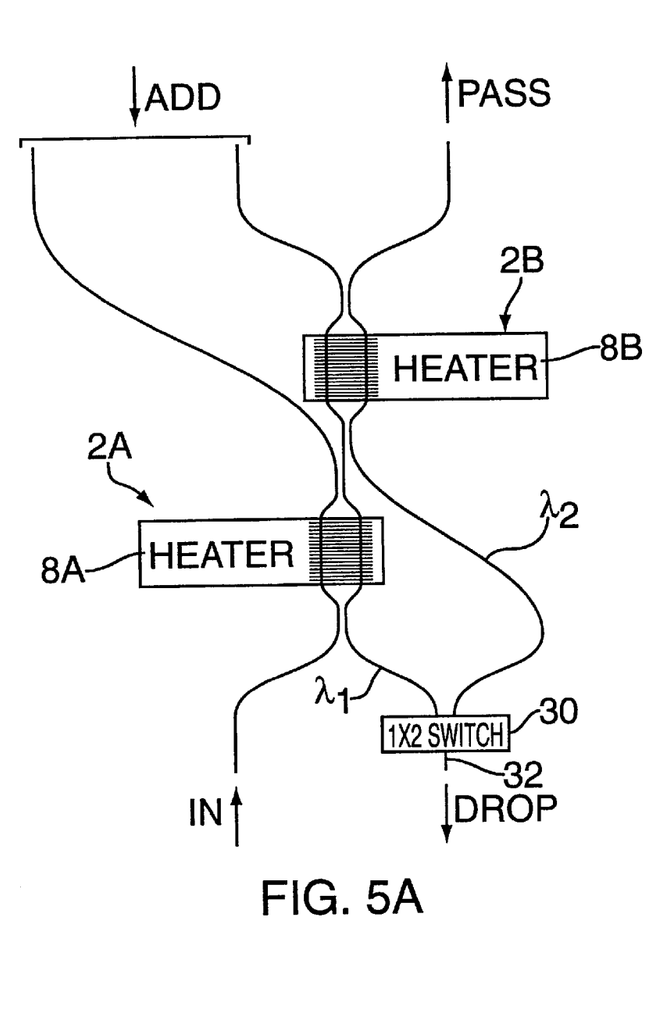
FIGS. 5A–B are schematic views of two embodiments of two-stage add/drop filters using two heaters with or without a switch in accordance with the present invention.

Referring to FIG. 5A there are employed two filter elements 2A and 2B, each having a heater 8A and 8B, respectively. A first selected wavelength $\lambda_1$ will be dropped from the filter element 2A and enter a 1x2 switch (shown by the numeral 30). The remaining light signal absent $\lambda_1$ will pass into the second filter element 2B. The temperature of the heater will be adjusted similar to what is shown in the example of FIG. 3 to drop a different wavelength of light $_2$ which will likewise enter the switch 30. In the embodiment shown in FIG. 5A, both wavelengths $\lambda_1$ and $\lambda_2$ are desirably employed by the user and the switch 30 enables the user to drop either $\lambda_1$ or $\lambda_2$ through a drop port 32 depending on need. Out-tuning is preferably used in the unused stage so that none of the information in the usable range is lost.

Figure 5B:
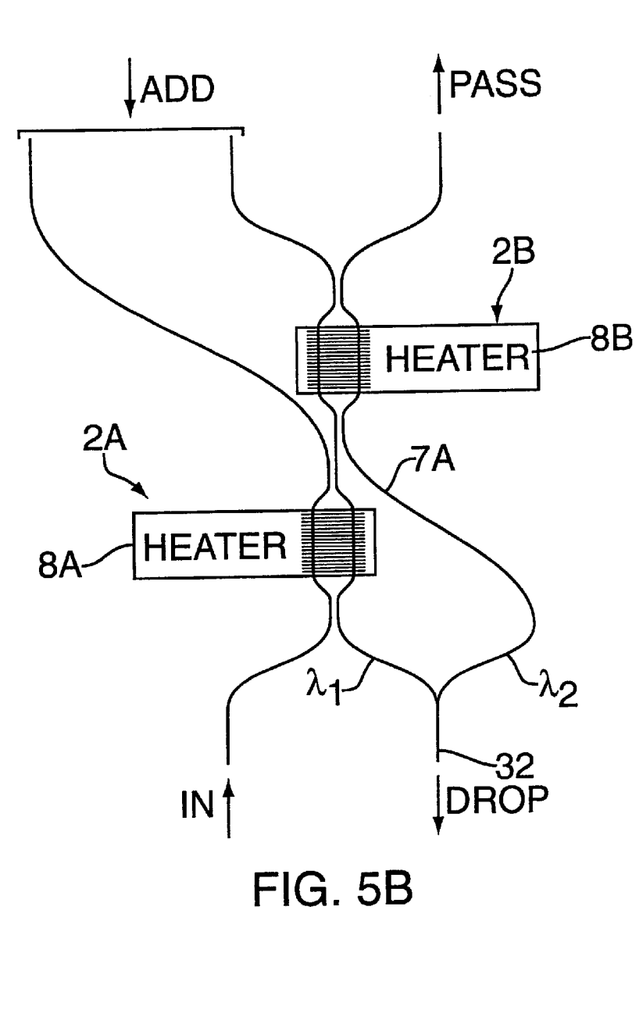

The embodiment shown in FIG. 5B is similar to the embodiment of FIG. 5A but the switch is replaced by a combiner. In this embodiment out-tuning must be used so that only the desired wavelength exits the drop port 32.

The arrangement shown in FIG. 5A does exhibit some loss of light intensity in the switch and the arrangement shown in FIG. 5B exhibits typically a greater loss (about 3-dB) but such loss is acceptable when the need is to have more than one stage in order to access a wider wavelength range and/or increase the tuning speed.

An out-tuned wavelength is a wavelength that lies outside of the range of wavelengths available within the temperature range of the heater as shown in the example of FIG. 3. For example, if a grating is of the type measured in to FIG. 3 and the heater has a selected temperature range of from 40° C. to 80° C. the tunable wavelengths available range from about 1563 nm to 1553 nm. Say a second grating such that, for the same temperature range, it filters wavelengths ranging from 1553 nm to 1543 nm. An out-tuned wavelength therefore would fall outside of the total range (e.g. 1564 nm or 1542 nm). Thus, referring to FIG. 5B, if $\lambda_1$ is within the tunable range and $X_2$ is an out-tuned wavelength, the only wavelength which will be dropped by the combiner will be $\lambda_1$.

Four-stage arrangements for dropping selected wavelengths by employing heaters in accordance with the present invention are shown in FIGS. 6A–6D.

Figure 6A:
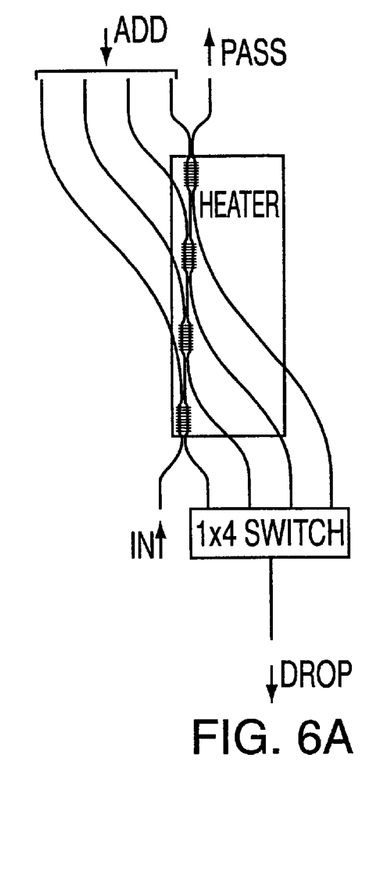
FIGS. 6A–6D are schematic views of four-stage add/drop filters of the present invention with one or more heaters and a variety of switch configurations.
Figure 6B:
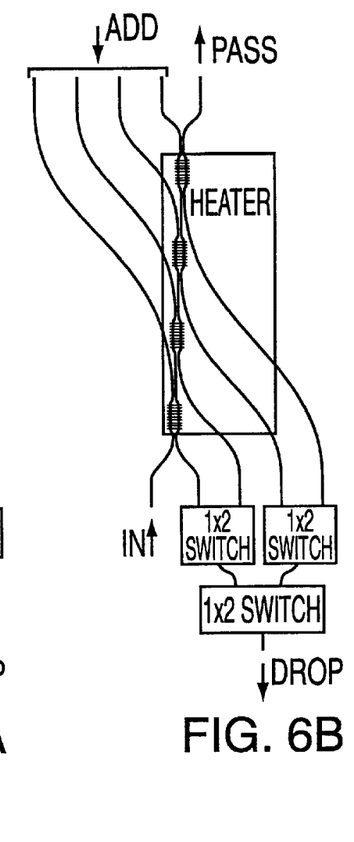

Referring to FIG. 6A there is shown an embodiment of the invention employing 4 stages and a single heater using a 1x4 switch to drop the desired wavelength signal. In the embodiment shown in FIG. 6B, instead of a 1x4 switch as shown in FIG. 6A, a series of 1x2 switches are employed to achieve the same result.

Figure 6C:
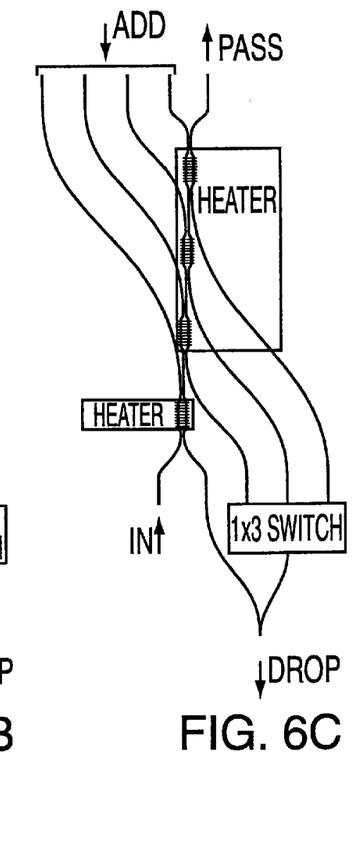

In the embodiment shown in FIG. 6C, two heaters are employed to permit out-tuning of the edge stages. Three ports drop a single wavelength light signal through a 1x3 switch and a fourth port drops a fourth channel which is combined with the output of the 1x3 switch to form the final drop port.

Figure 6D:
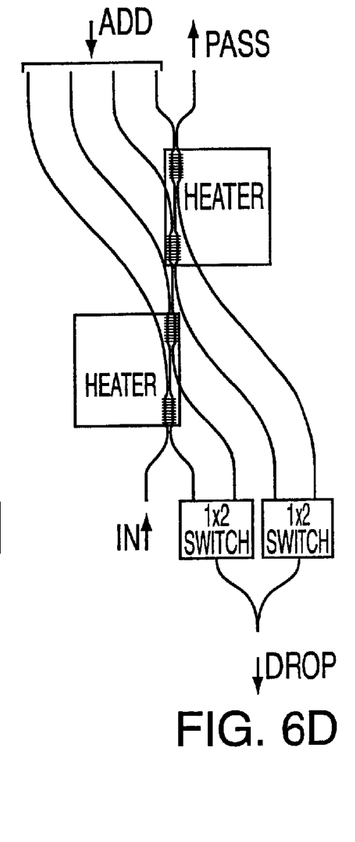

The embodiment shown in FIG. 6D employs two heaters to permit out tuning of the edge stages and 1x2 switches. The outputs of the 1x2 switches are combined to form the final drop port.

Figure 7:
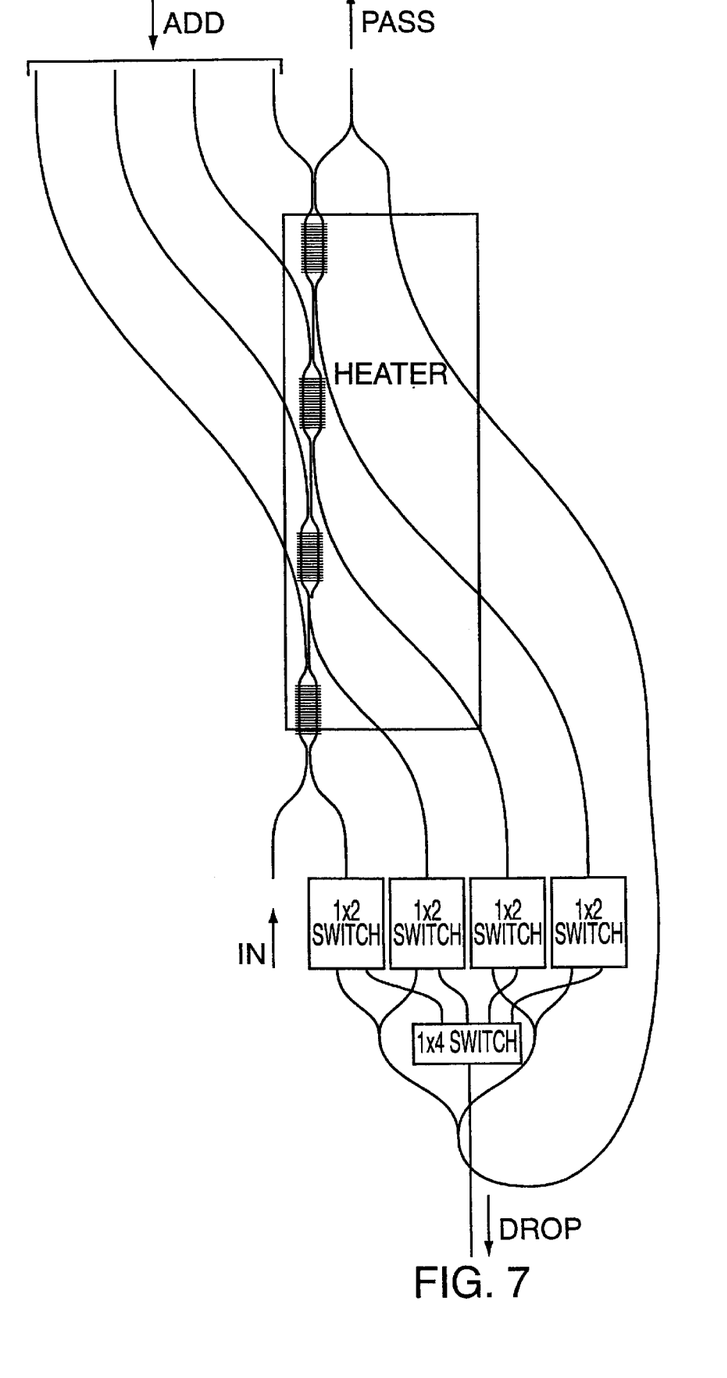
FIG. 7 is a schematic view of a four stage add/drop filter in accordance with the present invention where the unused channels are returned to the bus.

The outputs of unused non-out-tuned stages contain information from the usable wavelength range, said information which would be desirable to return to the bus. Such an embodiment is shown in FIG. 7 where the unused channels are collected and returned. In this embodiment, there is provided a 1x2 switch at the output of each stage to send the signal to either the drop or the pass port. The collection of the unused channels in FIG. 7 may use, for example, a 6-dB combiner. The reinsertion of the unused channels onto the bus may use, for example, a 3-dB combiner.

Figure 8:
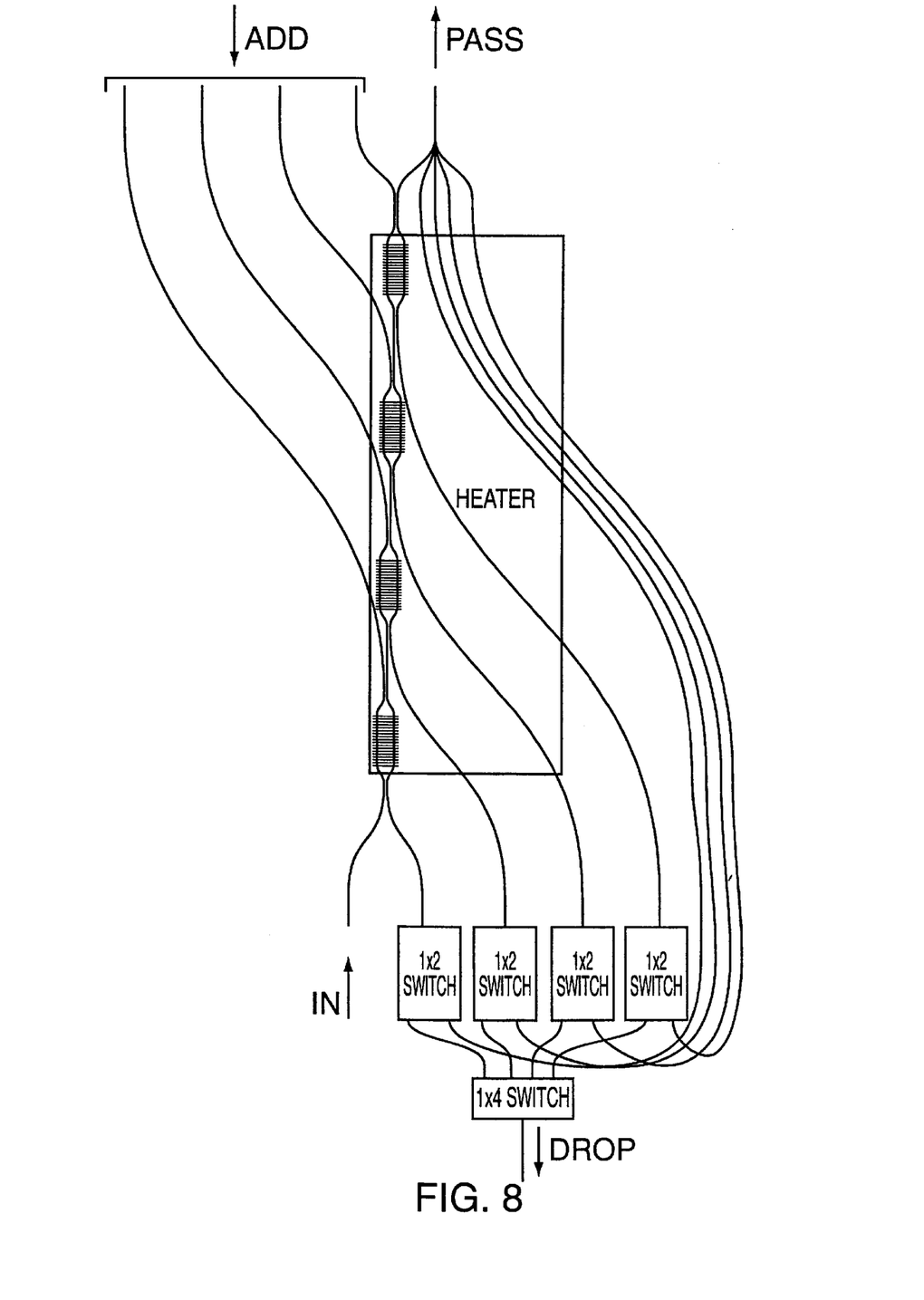
FIG. 8 is a schematic view of a four stage add/drop filter of the present invention where the unused channels are combined directly with the pass-through line using a 1x5 combiner.

As shown in the embodiment of FIG. 8, one way to reduce the loss in the collected channels to 7-dB would be to route all four channels and combine them with the pass through line using a 1x5 combiner. This increases the loss of the pass-through channels from 3 to 7-dB. This is still acceptable because it equalizes all the channels that end up passing.

Figure 9:
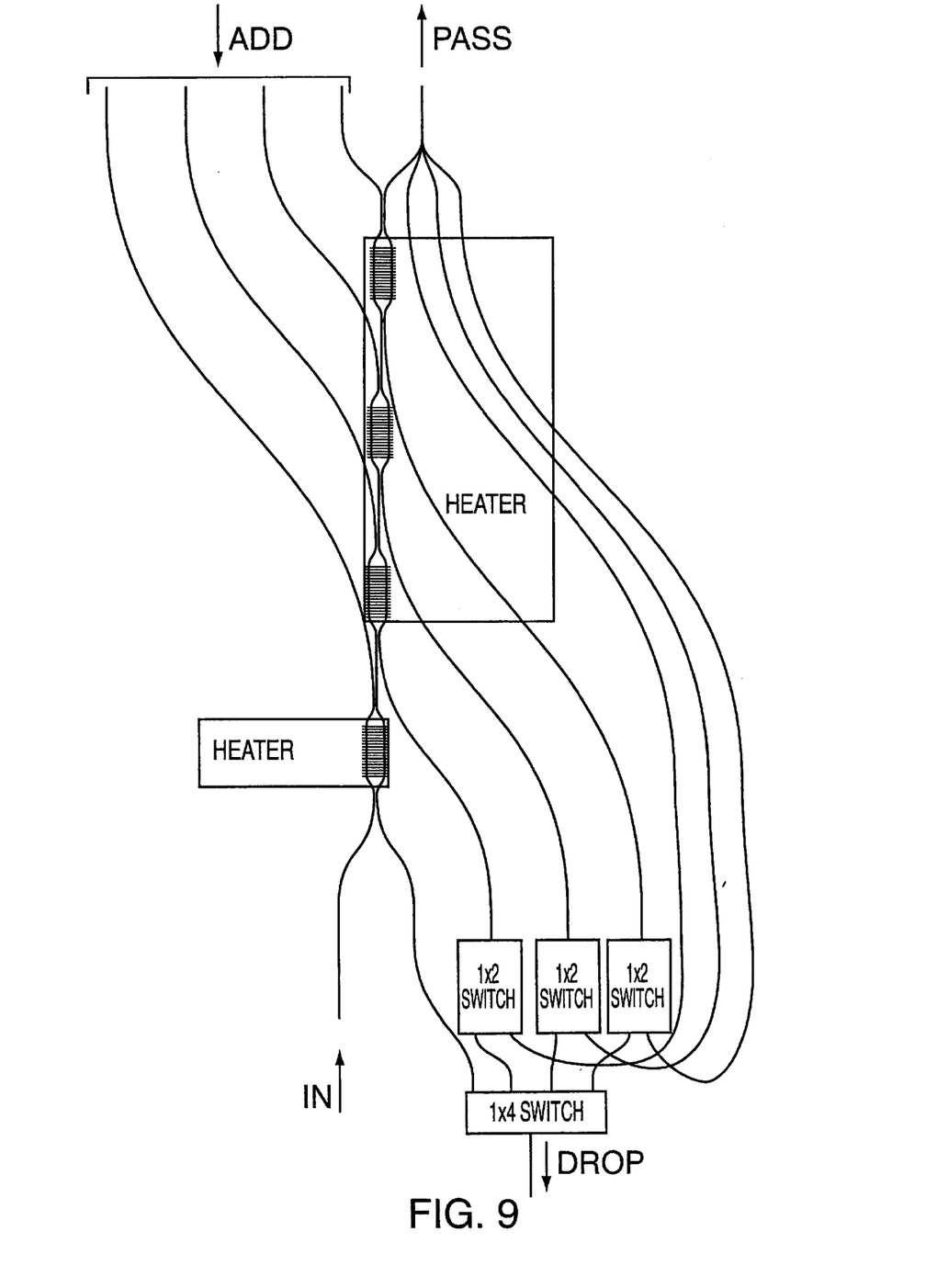
FIG. 9 is a schematic view of a four stage add/drop filter in accordance with the present invention employing out tuning of one edge of the filter to reduce the number of switches and the complexity of the combiner.
Figure 10:
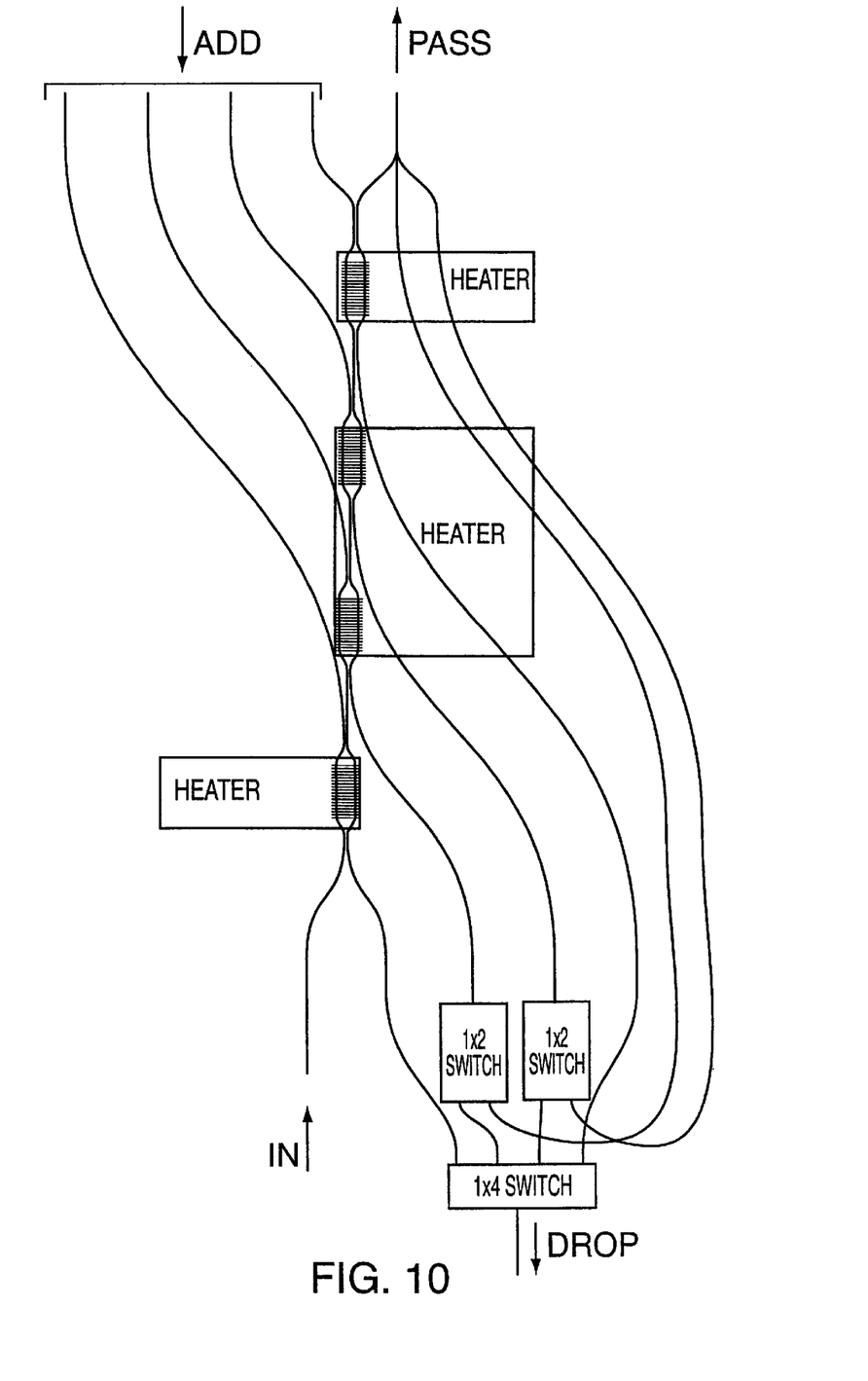
FIG. 10 is a schematic view of a four stage add/drop filter in accordance with the present invention employing out tuning of both edges of the filter to reduce the number of switches and the complexity of the combiner.

Tuning out the edge stages is possible in this type of environment resulting in simplification of the optical circuit. As shown in FIG. 9 one less 1x2 switch is needed and the 1x5 combiner at the pass port becomes a 1x3 combiner reducing the loss from 7 to 4.7-dB, although an additional heater is required. As shown in FIG. 10, another 1x2 switch can be eliminated if one more heater is added.

Figure 11:
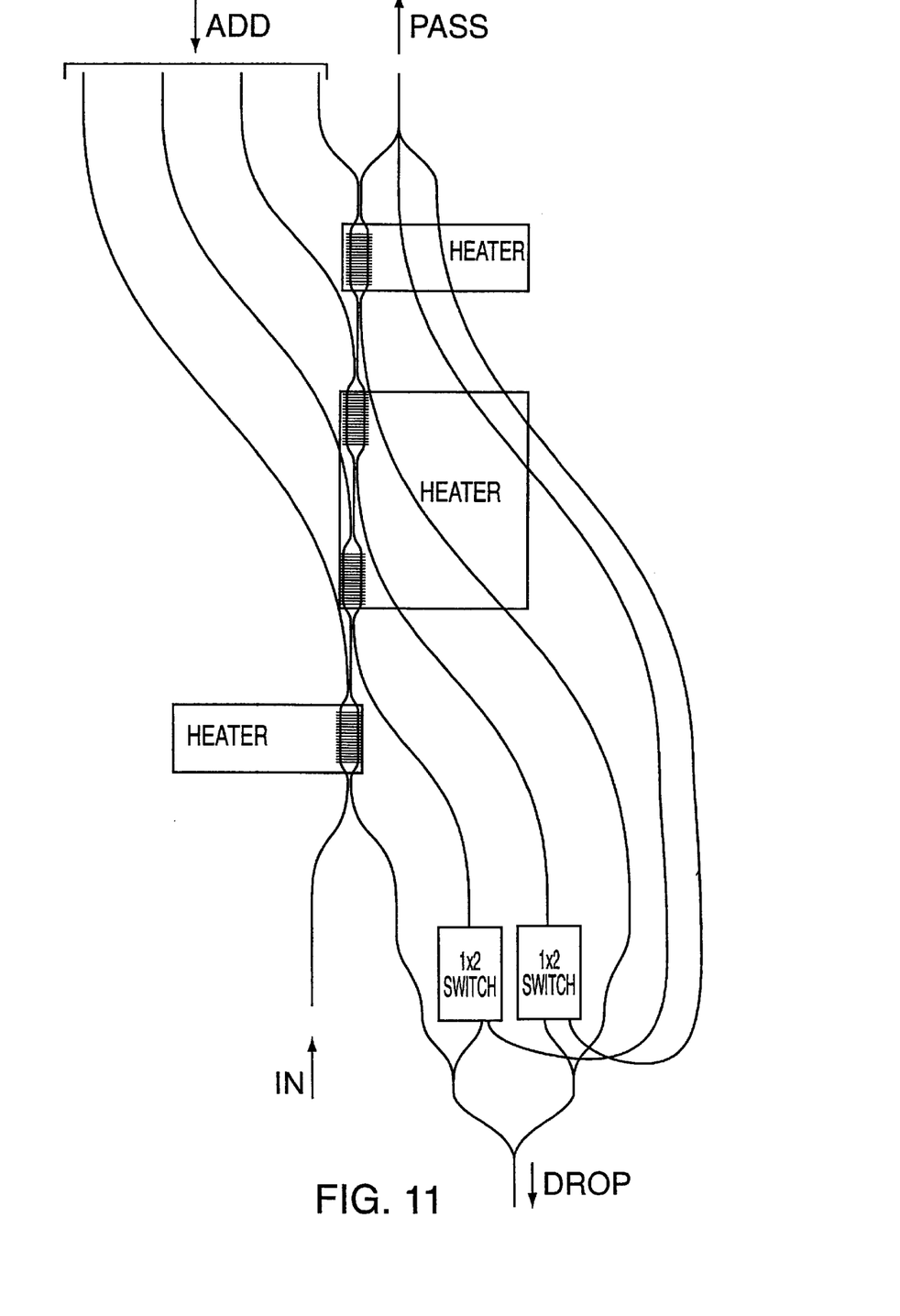
FIG. 11 is a schematic view of another embodiment of a four stage add/drop filter of the present invention employing out-tuning of the edges and a minimal number of switches.

In another embodiment of the invention, a modification of the embodiment shown in FIG. 10 is provided with a 1x4 combiner instead of a 1x4 switch at the drop port as shown in FIG. 11.

Figure 12:
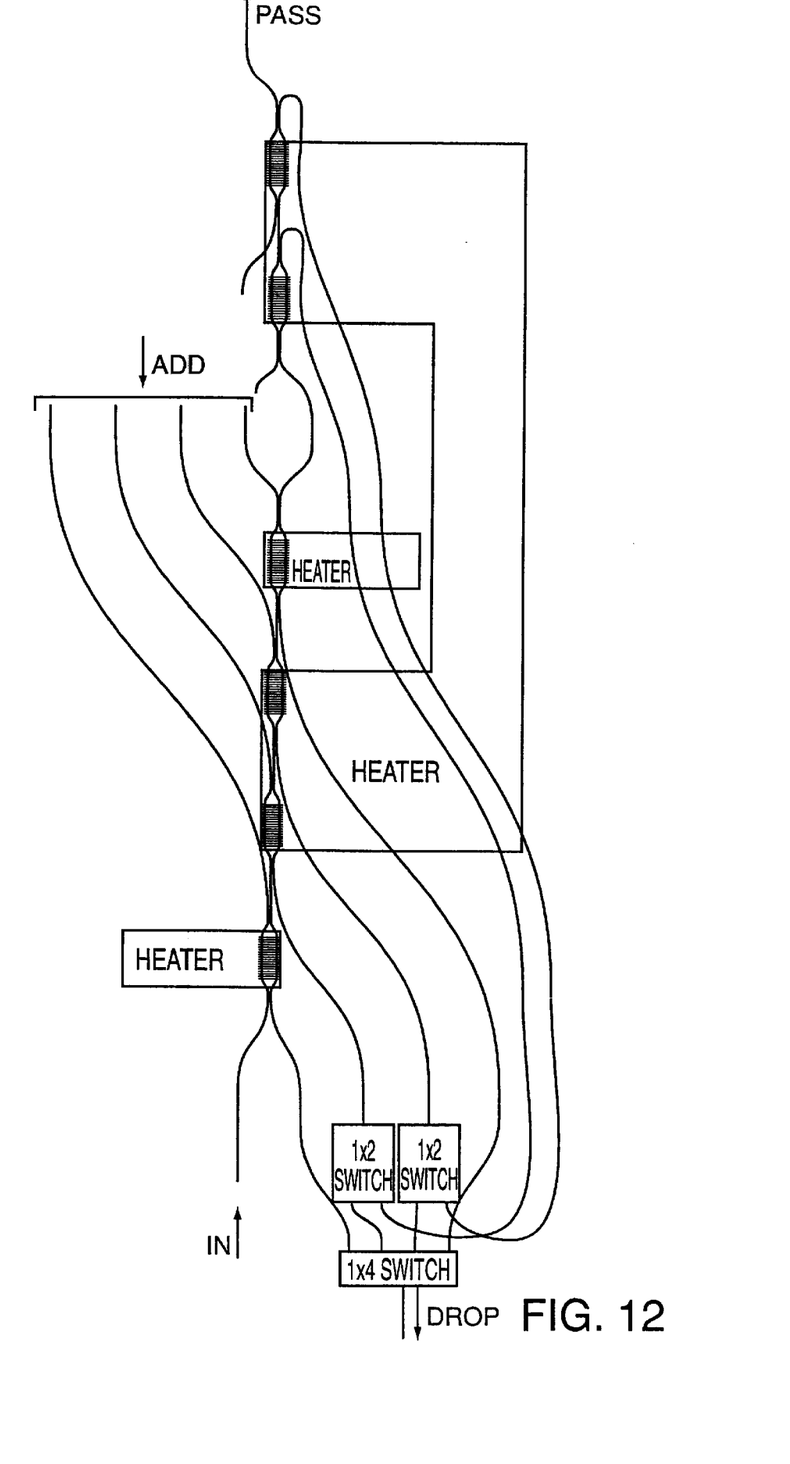
FIG. 12 is a schematic view of a four stage add/drop filter of the present invention where the unused channels are combined with the pass- through line using add filters.

In another embodiment of the invention, a modification of the embodiment shown in FIG. 10 is provided with add filters instead of a 1x3 combiner at the pass port as shown in FIG. 12. The add filters have gratings with the same periods as the gratings of the add/drop filters to which they correspond and they share the same heaters with (or in general are heated to the same temperature as) these add/drop filters. The add filters can have very low optical loss, circumventing the factor of N loss of 1xN combiners.

It will be understood that all of the configurations shown at the drop ports in FIGS. 5–11 can be implemented at the add ports. It will also be understood that all of the multi-stage configurations shown in FIGS. 5–11 employing Mach-Zehnder type devices of the kind shown in FIG. 4A can also employ 100% directional couplers of the kind shown in FIG. 4B or single waveguides between 3-port optical circulators of the kind shown in FIG. 4C.

What is claimed:

1. A method of segregating a desired wavelength from a multiple wavelength light signal, the method comprising the steps of:

providing an optical signal device comprising:
   a) a substrate,
   b) a pair of first and second spaced apart cladding layers,
   c) a core layer including a waveguide or a pair of opposed waveguides positioned between the pair of cladding layers having a refractive index greater than the refractive indices of the first and second cladding layers such that the difference between the refractive indices of the core layer and the cladding layers enables the multiple wavelength light signal to pass through the device in a single mode,
   d) a grating region present in each of the cladding layers and the core layer, the grating forming a filter element, the filter element being configured to cause a single wavelength of light of the multiple wavelength light signal to be segregated therefrom, and
   e) a tuning apparatus for varying the refractive index of at least the core layer to thereby control the wavelength of the light which is to be segregated from the multiple wavelength light signal;

passing the multiple wavelength light signal through the optical signal device; and tuning the tuning apparatus to segregate the desired wavelength from the multiple wavelength light signal.

2. The method of claim 1, wherein at least the core layer of the optical signal device is made of a thermosensitive material, and the tuning apparatus comprises a heater.

3. The method of claim 2, wherein the thermosensitive material has thermo-optic coefficient of at least about $10^{-4}/°$C. in absolute value.

4. The method of claim 2, wherein the thermosensitive material includes a polymeric material.

5. The method of claim 1 wherein the optical signal device has an input port for inputting the multiple wavelength light signal, a drop port for dropping the single wavelength of light segregated from the multiple wavelength light signal, a pass port for outputting the remaining wavelengths of the multiple wavelength light signal, and an add port for adding to the remaining wavelengths an optical signal having a wavelength equal to the dropped wavelength; and wherein the multiple wavelength light signal is passed into the device via the input port.

6. The method of claim 5 wherein the core layer of the optical signal device includes a pair of opposed waveguides, the opposed waveguides being coupled by a 100% coupler, and wherein the grating region is present in the coupling region of the 100% coupler.

7. The method of claim 6 wherein the 100% coupler is selected from the group consisting of a 100% directional coupler and a 100% MMI coupler.

8. The method of claim 1 wherein the core layer of the optical signal device includes a pair of opposed waveguides, the opposed waveguides being coupled to each other in each of two regions by a 3 dB coupler, and substantially uncoupled in between, and wherein the grating region is present in the uncoupled region of the opposed waveguides.

9. The method of claim 8 wherein the 3 dB coupler is selected from the group consisting of a 3 dB directional coupler and a 3 dB MMI coupler.

10. The method of claim 1 wherein the core layer of the optical signal device includes a waveguide between two three port optical circulators, the grating region being present in the waveguide.

* * * * *